No. 725,457. PATENTED APR. 14, 1903.
H. LEMP.
STEERING CHECK FOR VEHICLES.
APPLICATION FILED JUNE 16, 1902.
NO MODEL. 3 SHEETS—SHEET 1.
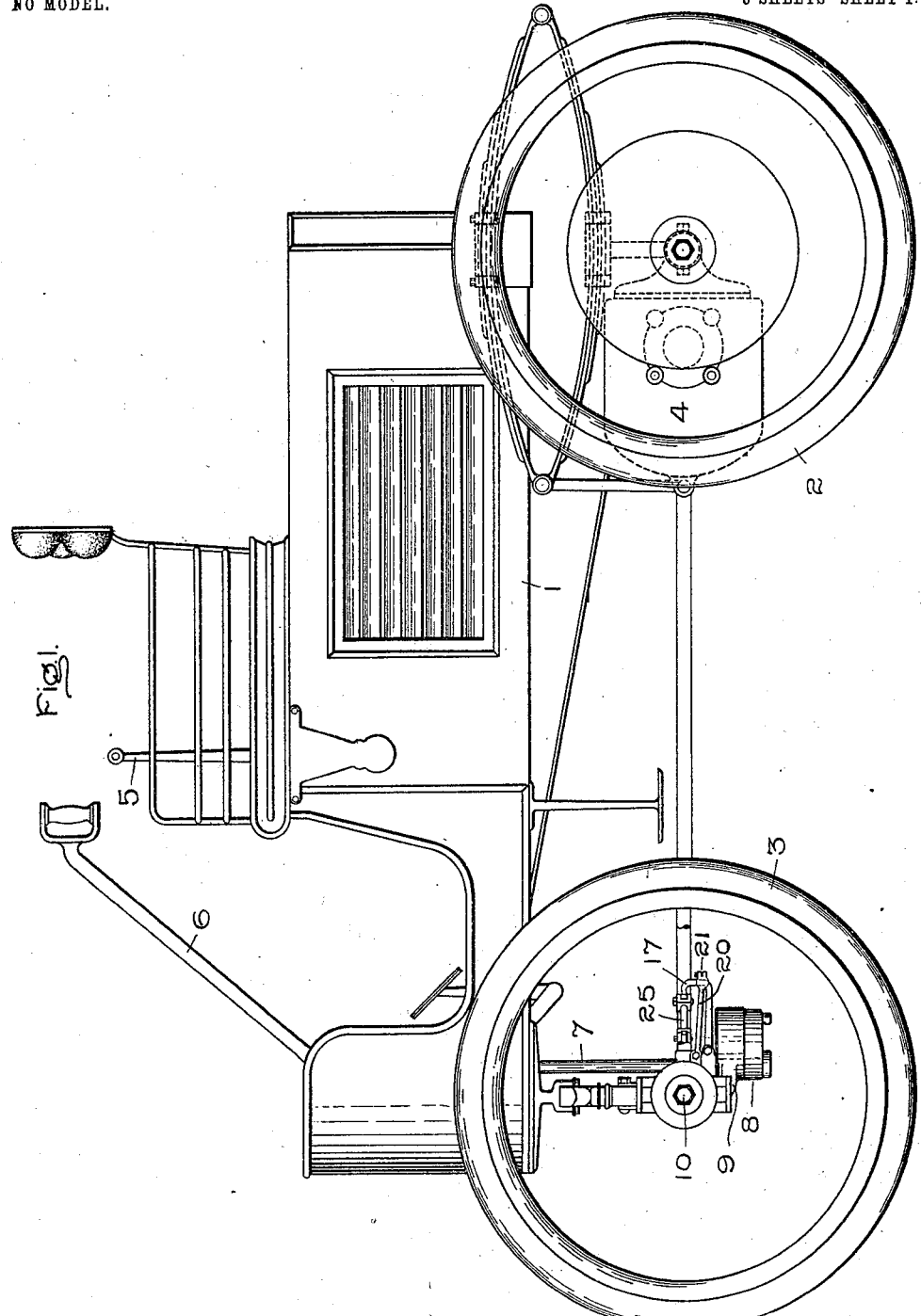
Witnesses.
Marcus L. Byng.
Alex F. Macdonald.
Inventor,
Hermann Lemp,
By Albert G. Davis
Atty.

No. 725,457. PATENTED APR. 14, 1903.
H. LEMP.
STEERING CHECK FOR VEHICLES.
APPLICATION FILED JUNE 16, 1902.
NO MODEL. 3 SHEETS—SHEET 2.
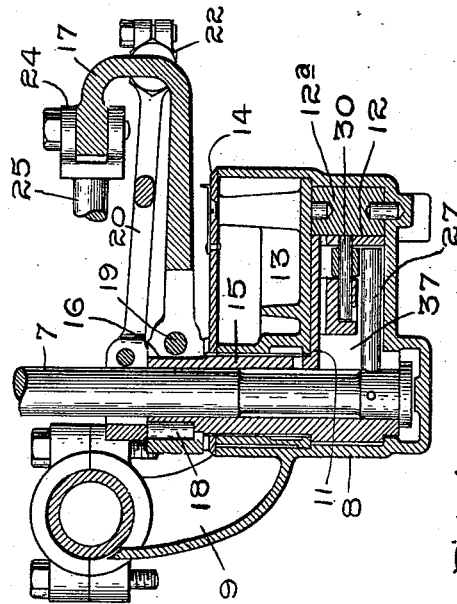
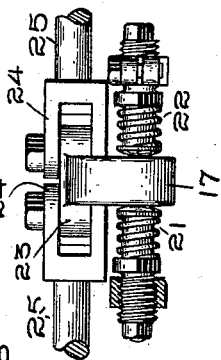
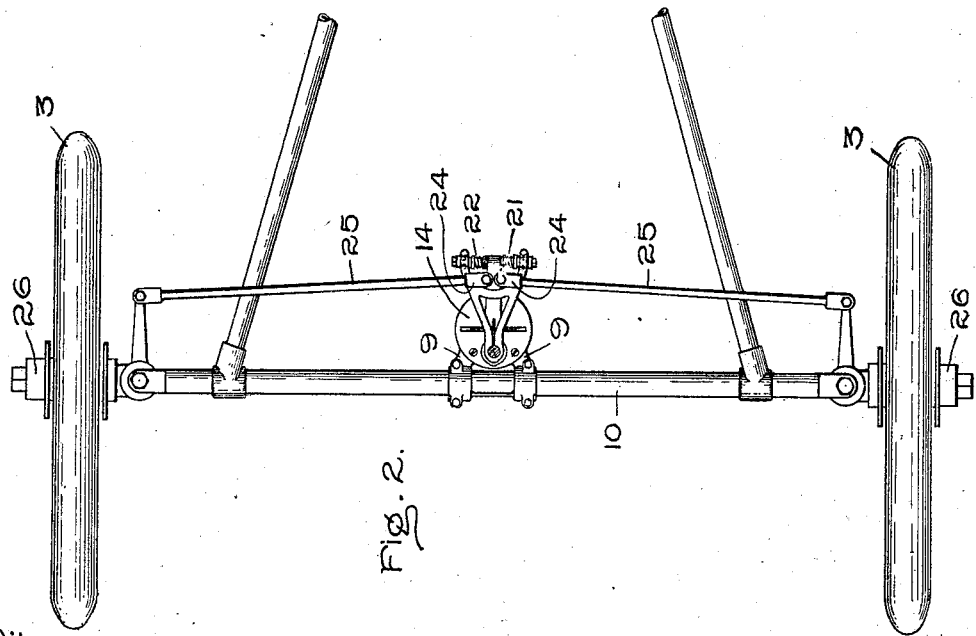
Witnesses.
Marcus L. Byng.
Alex R. Macdonald.
Inventor,
Hermann Lemp,
By Albert G. Davis
Att'y.

No. 725,457. PATENTED APR. 14, 1903.
H. LEMP.
STEERING CHECK FOR VEHICLES.
APPLICATION FILED JUNE 16, 1902.
NO MODEL. 3 SHEETS—SHEET 3.
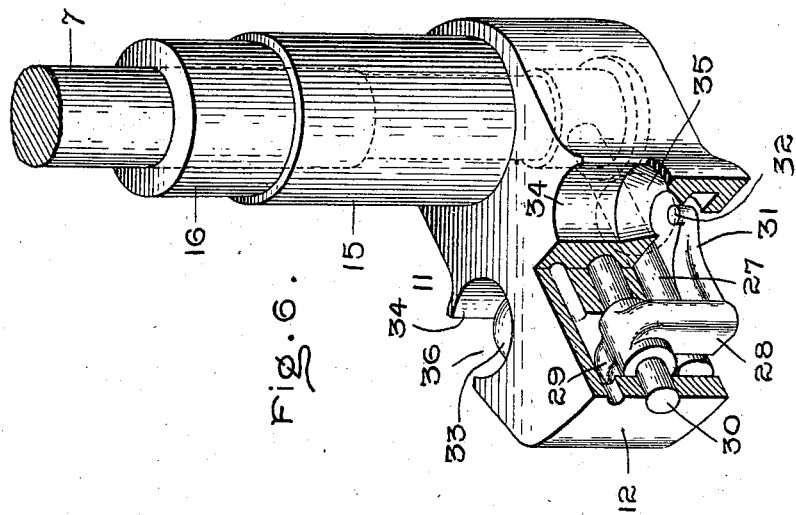
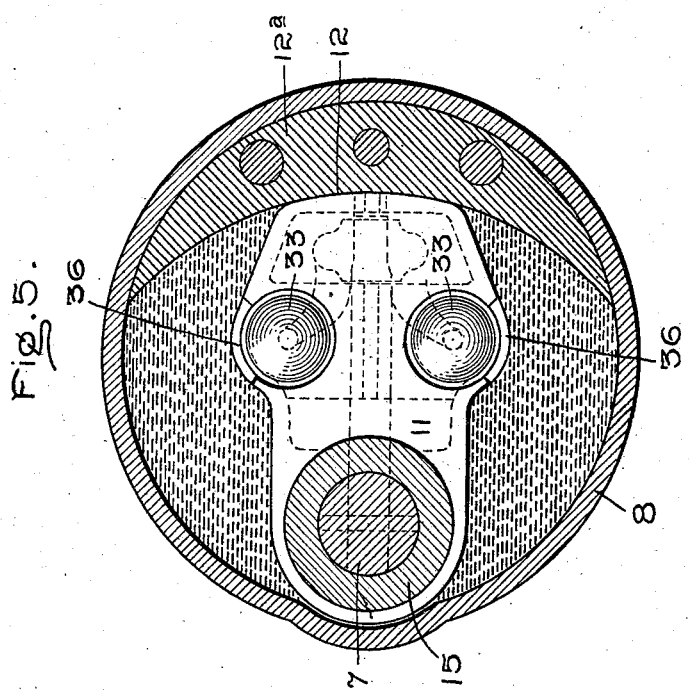
Witnesses:
Marcus L. Byng.
Alex F. Macdonald.
Inventor,
Hermann Lemp,
By Albert G. Davis,
Att'y

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

STEERING-CHECK FOR VEHICLES.

SPECIFICATION forming part of Letters Patent No. 725,457, dated April 14, 1903.

Application filed June 16, 1902. Serial No. 111,924. (No model.)

*To all whom it may concern:*

Be it known that I, HERMANN LEMP, a citizen of the United States, residing at Lynn, county of Essex, State of Massachusetts, have invented certain new and useful Improvements in Steering-Checks, of which the following is a specification.

The present invention relates to steering-checks that are employed to prevent the transmission of wheel strains to the hand of the operator when the vehicle is in operation.

The present invention has for its object to provide a steering-check which is small, simple, and compact in its construction and reliable in its operation.

The improvement in the present construction over those described and claimed in my previous patents resides principally in the piston and the valves for controlling its movements, by means of which the size of the check as a whole is reduced and the use of valve-springs obviated.

In the accompanying drawings, which represent an embodiment of my invention, Figure 1 is a side elevation of a vehicle equipped with my improved steering-check. Fig. 2 is a plan view of the steering-check mounted in place on a vehicle and connected to the steering-wheels. Fig. 3 is a vertical section of the steering-check. Fig. 4 is a detail view in elevation of the spring-buffers employed to center the parts. Fig. 5 is a transverse section of the steering-check, and Fig. 6 is a perspective view of the piston with certain of the parts broken away for the purpose of illustration.

1 represents a vehicle-body which is provided with driving-wheels 2 and steering-wheels 3. In the present instance electric motors 4 are employed for propelling purposes; but any other form of motor may be substituted. 5 represents the lever for controlling the speed of the vehicle, and 6 represents the steering-lever, which is connected to the vertically-extending steering-shaft 7.

The steering-check comprises a stationary element 8, which in the present instance constitutes the cylinder. Formed integral with said element are lugs 9, by means of which it is secured to the front stationary axle 10 or other suitable support. Mounted eccentrically within the cylinder or casing is a piston 11, which is substantially L-shaped, as indicated in Fig. 6. The end 12 of the piston is made concentric with the shaft 7, and the space between the end and the surrounding casing is occupied by a segmental piece 12ª, which has its inner wall curved concentrically with the center of movement of the piston, and its outer surface is curved to fit the inner wall of the cylinder 8. Situated above the piston is a removable member 13, which divides the casing into two parts, the lower portion forming the cylinder for the piston and the upper portion forming a reservoir or chamber for the normally quiescent fluid which fills the cylinder and acts to retard the movements of the piston. Situated above the detachable piece 13 is a cover 14, which also forms the top of the check. Formed integral with the piston is a hub or sleeve 15, which is provided with a shouldered portion 16, arranged to receive the lever 17. The lever is rigidly connected to the piston by means of the pin 18 and the transversely-extending bolt 19. Situated above the lever and rigidly secured to the shaft is a triangular frame 20, which carries the spring-pressed buffers 21 and 22. The object of these spring-pressed buffers is to permit of a certain amount of lost motion between the lever and the frame when it is necessary to open the fluid-controlling valves, as will hereinafter appear. The outer end of the lever 17 is curved backward, and the spring-pressed buffers are situated on opposite sides of this curved portion and are normally in engagement therewith. By curving the lever backward the rods connecting it with the steering-wheels are brought close to the front axle out of the way and by changing the position of the pivots the leverage can be varied. The spring-pressed buffers also serve to return the lever to a position of rest and permit the fluid-controlling valves to close and lock the piston against moving independently of the cylinder or casing 8. The end of the lever is expanded, as indicated at 23, and pivotally secured to this expanded end are forks 24. These forks are formed on or secured to the rods 25, which are connected to the stub-axles 26.

In certain other structures patented by me the valves for controlling the passage of fluid from one side of the piston to the other were situated on the sides of the piston and were normally held closed by means of springs. In the present instance the valves are of the gravity type and are located on the top of the piston or in cavities formed in the top. The object in changing the character of the valves and their disposition is to reduce the size of the steering-check as a whole. I have found that with the construction shown the parts can be made more compact, and for that reason the check as a whole can be made lighter, which is an important consideration in vehicle-work.

Referring more particularly to Figs. 5 and 6, 7 represents the shaft, and located at the bottom thereof and extending at right angles is an actuator 27. This actuator is cylindrical on the end adjacent to the shaft and also at the outer end, where it engages with the rocker-arms 28 and 29. For convenience and simplicity of construction the rocker-arms are formed in a single piece; but it is evident that they could be formed separately without departing from my invention. The rocker-arms are pivotally supported on a shaft 30, that extends at right angles to the steering-shaft 7 and is carried by the piston. The rocker-arm is provided with a suitable hub having finished faces, which faces engage with the walls of the cavity formed in the piston-body and prevent it from moving longitudinally on its supporting-shaft. I find it desirable to permit the rocker-arms to move on the shaft 30 rather than to have the shaft 30 move in the piston-body, because when the parts wear it is simpler to replace the rocker-arms than substitute a new piston or provide bushings to take up the wear of the parts. Each rocker-arm comprises a vertically-extending portion and a portion 31, which extends parallel, or substantially so, with the actuator 27. On the end of each of the arms 31 is formed a projection 32, which engages with the under surface of one of the ball-valves 33. The latter are seated in cavities formed in the piston-body. In the present instance each cavity comprises a cylindrical portion 34 and a tapered portion 35. The tapered portion receives the ball and forms the seat therefor, and owing to its conical shape the valve will always make a tight fit. The object in making the cavities vertical is so that they will drop into place. It is obvious, of course, that they can be somewhat out of the perpendicular plane shown. The balls are preferably made of hard steel. The actuator 27 extends between the rocker-arms, as indicated in Fig. 6, and when it is moved to the right or left from a central position one rocker-arm will be raised while the other is depressed. It is to be understood that when the actuator is in the intermediate position both of the ball-valves are resting on their respective seats. It is to be noted that whereas the actuator moves in a plane at right angles to the shaft 7 the ball-valve moves vertically or in a direction parallel with said shaft. This change of movement from a horizontal to a vertical plane is accomplished by means of the rocker-arm, and the valves being of substantial size will drop into place as soon as the projections 32 on the ends of the rocker-arms are moved out of engagement therewith. This construction enables me to dispense with all springs, yet at the same time provide valves which are quick acting and which will cut off the transfer of fluid from one side of the piston to the other. When one of the valves is positively raised, fluid from one compartment or the other will pass through the cut-away portions 36 in the piston-body and around the ball-valve into the chamber 37, formed in the piston-body. The movement of the piston when the valve is raised will create a pressure which is great enough to raise the second valve from its seat and permit the normally quiescent fluid to flow from one side of the piston to the other. The instant the pressure is relieved on the steering-shaft the spring-pressed buffers 21 and 22 will bring the actuator 27 and the rocker-arms to the position of rest, and the valves will be seated and cut off further transfer of fluid. On the other hand, assuming that the operator is in the act of steering and a road obstruction is met, the tendency of the piston to move, due to the thrust on the wheel or wheels, creates a fluid-pressure on one side of the piston, which causes the valves to be seated, thus locking the wheel or wheels against the thrust and preventing the transmission of any strain to the hand of the operator.

In devices of this kind there is of necessity a slight amount of lost motion between the steering-handle 6 and the piston, which lost motion is provided for the purpose of enabling the valves to be opened, and the latter are so positioned with respect to the steering-handle that the movement of the handle in one direction or the other first opens the valve and then moves the piston and the steering-wheels. In the drawings the steering-check is shown in connection with what is commonly called a "tiller" steering mechanism; but it is equally applicable to the side or center steering devices.

What I claim as new, and desire to secure by Letters Patent of the United States, is—

1. In combination, a cylinder, a piston, valves mounted thereon, a shaft, and a pivotally-supported rocker-arm actuated by the shaft for moving the valves.

2. In combination, a cylinder containing a body of fluid, a piston, valves mounted on the piston, a shaft, an actuator mounted on the shaft, and a rocker-arm for moving the valves which is moved by the actuator.

3. In combination, a piston, a cylinder containing a body of normally quiescent fluid, gravity-valves movable with the piston, and means for imparting a vertical movement to the valves.

4. In combination, a piston having cavities formed therein, a cylinder, gravity-valves mounted in the cavities, and vertically-moving devices which engage with and raise the valves.

5. In combination, a piston, a cylinder, vertically-moving valves mounted on the piston, a shaft capable of oscillating movement, and means for transforming said oscillating into vertical movement for raising one valve after the other.

6. In combination, a cylinder, a piston, cavities formed in the piston which are larger at the top than at the bottom, gravity-valves mounted in the cavities, a rocker-arm which extends under each of the cavities, and means for imparting a rocking movement to the arm.

7. In combination, a cylinder, a piston having cavities or openings formed therein, valves mounted in certain of the cavities, and a rocker-arm for actuating them which is mounted in another of the cavities or openings.

8. In combination, a cylinder, a piston, valves mounted thereon, a rocker-arm for actuating the valves, a pivot for the arm, and an actuator for the rocker-arm which extends parallel with the pivot.

9. In combination, a cylinder, a piston, valves mounted on the piston, a rocker-arm which actuates both valves but is capable of moving only one at a time, a shaft which enters the piston and is capable of a slight movement independent thereof, and an actuator which is carried by the shaft and is arranged to rock the arm in one direction or the other as desired.

10. In combination, a cylinder containing a body of normally quiescent fluid, a piston having parallel top and bottom surfaces, valve-cavities formed in the top of the piston which open into the sides, valves mounted in the cavities, and means for actuating the valves.

11. In combination, a cylinder, a piston, cavities formed in the piston which are larger at the top than at the bottom, ball-valves mounted in the cavities which are capable of moving upward freely and of seating themselves in the small end of the cavities, a rocker-arm, an oscillating shaft, and an actuator carried by the shaft which extends through the body of the rocker-arm and imparts movement thereto.

12. In combination, a cylinder, a piston, a shaft which enters the piston and is capable of moving independent thereof, a lever rigidly secured to the piston and having a turned-over end, a frame rigidly secured to the shaft, spring-buffers between the lever and frame, gravity-valves mounted in the upper side of the piston, a rocker-arm for raising the valves, and an actuator carried by the shaft for imparting movement to the rocker-arm.

In witness whereof I have hereunto set my hand this 10th day of June, 1902.

HERMANN LEMP.

Witnesses:
ALEX F. MACDONALD,
DUGALD McK. McKILLOP.